UNITED STATES PATENT OFFICE.

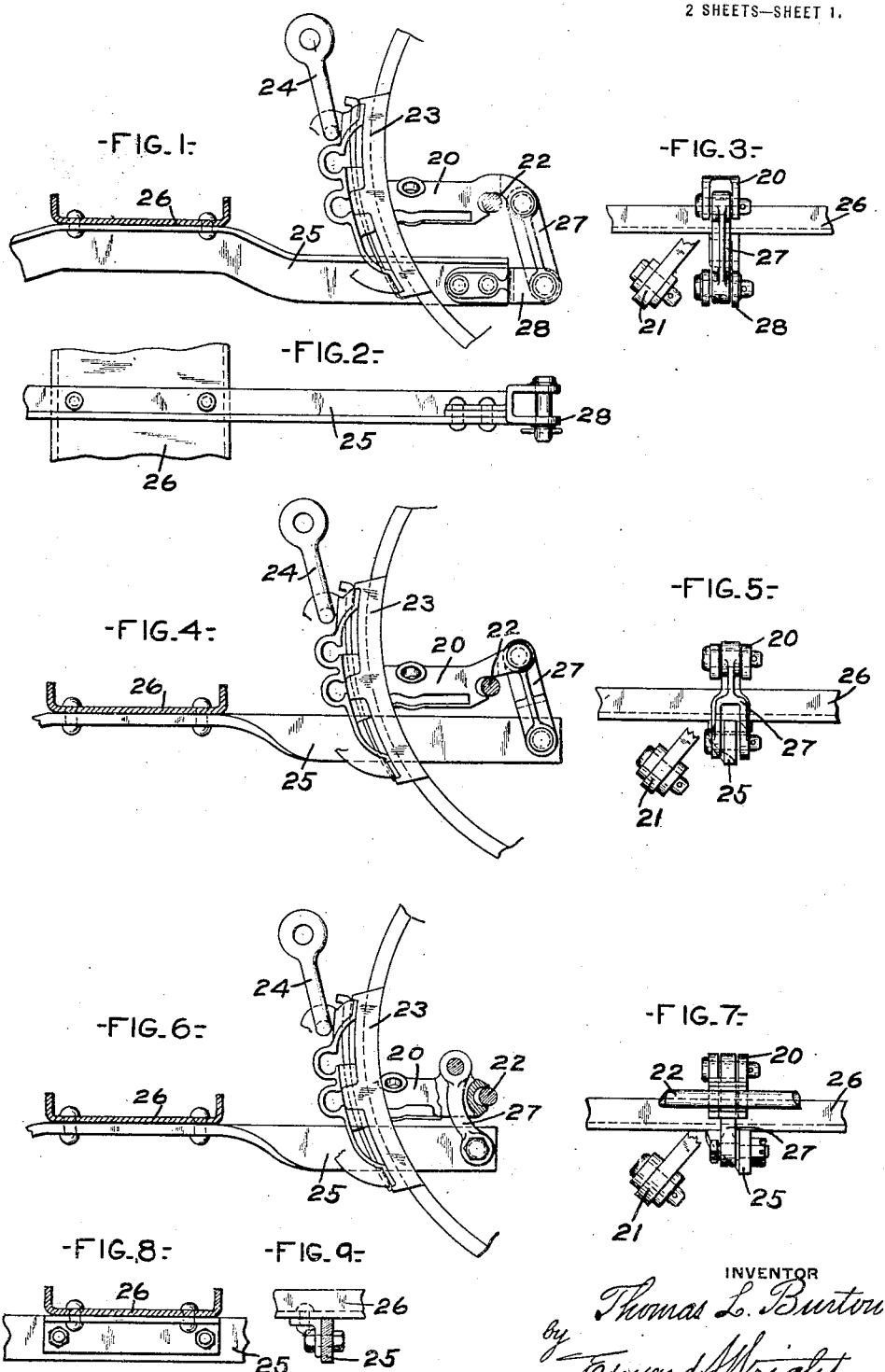

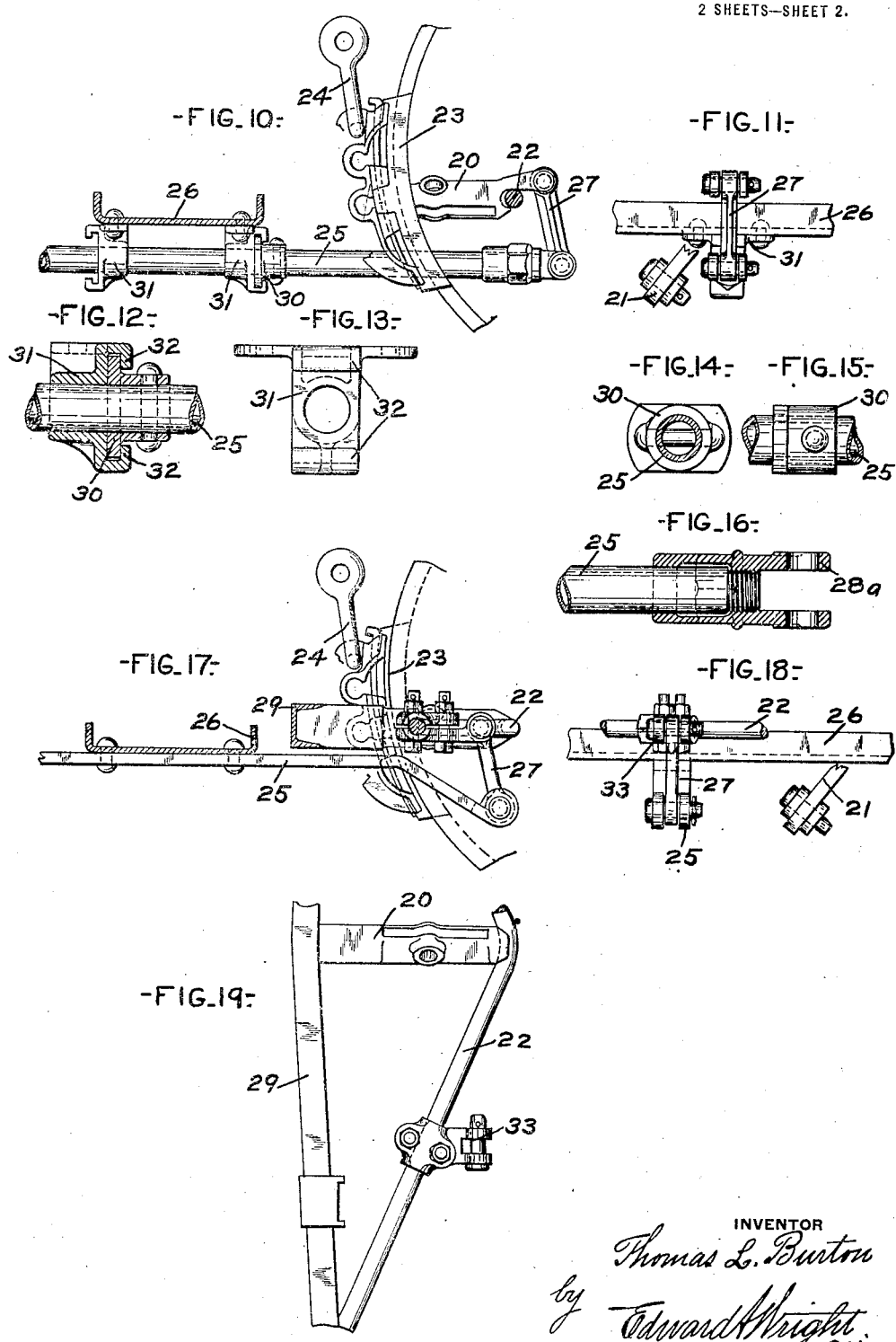

THOMAS L. BURTON, OF ST. LOUIS, MISSOURI.

BRAKE-BEAM SUPPORT.

1,340,008.

Specification of Letters Patent.

Patented May 11, 1920.

Application filed September 11, 1918. Serial No. 253,529.

*To all whom it may concern:*

Be it known that I, THOMAS L. BURTON, a citizen of the United States, residing at the city of St. Louis, in the State of Missouri, have invented a certain new and useful Improvement in Brake-Beam Supports, of which improvement the following is a specification.

This invention relates to means for supporting the brake beams of railway trucks and more particularly to the type of support known as the third point suspension in which there is employed, in addition to the usual hangers at the opposite ends of the brake beam, one or more supports for a projecting portion of the brake beam, such as the fulcrum post, or strut, or truss rod, for the purpose of maintaining the brake beam substantially level and parallel in its various positions, and under different conditions of wear of the brake shoes and wheels.

It has been proposed to provide one or more safety bars attached to the spring plank of the truck and extending beneath the brake beam for carrying this additional support for the strut member of the beam, and one of the objects of my present invention is to provide an improved support of this character in which the additional point or points is or are carried by a link or links pivotally connected at the lower end to the safety bar and at the upper end to the strut or truss rod of the brake beam.

Another feature of my invention comprises an improved attachment for supporting the safety bar from the spring plank.

In the accompanying drawings, Figure 1 is a side elevation, with parts in section, of one form of brake beam suspension embodying my improvement; Fig. 2, a plan, and Fig. 3, an end view of same; Fig 4, a view similar to Fig. 1, but showing a modification; Fig. 5, an end view of the same; Figs. 6 and 7, views similar to Figs. 4 and 5, and showing another modification; Figs. 8 and 9, detail views showing a modified attachment to the spring plank; Figs. 10 and 11, side and end views, respectively, illustrating another form of safety bar and attachment; Figs. 12, 13, 14, 15, and 16, detail views of the attachments to the safety bar of Fig. 10; Figs. 17, 18 and 19, side and end views and plan, respectively, illustrating a further modification.

According to the construction shown, the brake beam is of the ordinary trussed type having a main compression member 29, a central strut or fulcrum member 20, on which the truck lever 21, of the brake system is adapted to be mounted in the usual way, a truss rod 22, and brake shoes 23, at the ends, with the usual hangers 24, therefor. The safety supporting bar 25, one or more, is attached to the spring plank 26, of the car truck and extends out beneath the brake beam. According to one of the features of my improvement, a supporting link 27, is pivoted at its lower end at the end of the safety bar while its upper end is pivotally connected to the strut or other portion of the brake beam, thus forming the additional point or points of support for the brake beam. The lower pivot of the link 27 is preferably so located that in the normal release position of the brake beam, the link, or the line joining its upper and lower pivot points, occupies a position inclined from the vertical toward the brake beam, whereby, when the brake beam is swung toward the wheel in applying the brakes, the link, turning upon the lower pivot, raises the pivot point on the brake beam at substantially the same rate as the brake shoes are raised by the swinging movement of the usual hangers 24, toward the wheel. In this way the brake beam is maintained substantially level at all times with the shoes practically concentric to the wheels in the various positions of the brake beam.

In Figs. 1, 2 and 3, the safety bar is shown in the form of an angle section having a jaw 28, fastened at its end to which the link 27, is pivoted.

In Figs. 4, 5, 6 and 7, the safety bar is shown as a flat bar bent to a vertical position at its ends. In Figs. 1 and 4, the link 27, is pivoted to an extension of the strut beyond the truss rod, while in Fig. 6, the link passes up through a slot or opening in the strut and is pivoted to the same at the rear of the truss rod. Figs. 8 and 9 show a rectangular safety bar riveted to the spring plank by means of an angle shaped strip.

In the modification shown in Figs. 10 to 16, the safety bar is cylindrical and may be formed of a pipe section having a threaded end for attaching the jaw 28ª, to which the link 27, is pivoted. For attaching the cylindrical bar to the spring plank, a flanged collar 30, is riveted to the bar and coöperates with a bracket 31, having flanges 32 forming grooves at top and bottom. The flanged collar on the bar is cut away at two opposite points so that the bar may slide through the cylindrical opening in the bracket and then be turned part way around with the collar flanges projecting into the grooves of the bracket as shown in Fig. 12. It will be evident that any other suitable form of pin and slot, or flange and groove connection operating upon the same principle between the bracket and the safety bar may be employed for this purpose. This holds the bar firmly in place against longitudinal movement and as the jaw 28$^a$, is connected to the link, 27, in this position the bar is thereby held against rotation. It may, however, be readily detached and taken down and replaced whenever it is desired to take down or repair the brake beam.

In the modification shown in Figs. 17, 18 and 19, the additional support is formed by two links 27 pivotally connected to the truss rod 22 by means of jaws 33, and to safety bars 25, one at each side of the center of the brake beam.

The action is substantially the same in either case, that is, the additional supporting link or links 27 operate in conjunction with the usual hangers to maintain the brake beam substantially level in its different positions so that it may swing in a substantially parallel relation with the brake shoes substantially concentric with the wheels. It will also be seen that even if one of the end hangers should break or become detached the safety bar would still support the beam and the additional supporting link would guide the beam with the brake shoes against the car wheels so the application of the brakes could still be effected.

Having now described my invention what I claim as new and desire to secure by Letters Patent is:

1. In a brake beam suspension, the combination of a bracket attached to the spring plank and having an opening, a safety bar extending through said opening and beneath the brake beam, a flange and groove connection between the bracket and safety bar, adapted to be locked against longitudinal movement by a partial rotation of said bar, and a supporting link for the brake beam pivotally connected at the end of said bar.

2. In a brake beam suspension, the combination of a bracket attached to the spring plank and having a circular opening, a cylindrical safety bar extending through said opening and beneath the brake beam, said bracket also having a groove, a flanged collar mounted on the safety bar and adapted to engage the groove of the bracket, and a supporting link for the brake beam attached to said bar.

3. In a brake beam suspension, the combination of a bracket attached to the spring plank and having a circular opening, a cylindrical safety bar extending through said opening and beneath the brake beam, said bracket also having a groove, a flanged collar mounted on the safety bar and adapted to engage the groove of the bracket, a jaw attached at the end of the safety bar, and a supporting link for the brake beam pivoted to said jaw.

4. In a brake beam suspension, the combination of a bracket attached to the spring plank and having an opening, a safety bar extending through said opening and beneath the brake beam, a flange and groove connection between the bracket and safety bar, adapted to be locked against longitudinal movement by a partial rotation of said bar, and a supporting link for the brake beam mounted on said bar.

5. In a brake beam suspension, the combination of a bracket attached to the spring plank and having an opening, a safety bar extending through said opening beneath the brake beam, and a flange and groove connection between the bracket and safety bar adapted to be locked against longitudinal movement by a partial rotation of said bar.

In testimony whereof, I have hereunto set my hand.

THOMAS L. BURTON.